Patented Nov. 24, 1931

1,833,808

UNITED STATES PATENT OFFICE

WILLIAM GRAHAM WOODCOCK, HUGH ALBERT EDWARD DRESCHER, ERNEST GEORGE BECKETT, AND JOHN THOMAS, OF GRANGEMOUTH, SCOTLAND, ASSIGNORS TO SCOTTISH DYES LIMITED, OF GRANGEMOUTH, SCOTLAND

DYESTUFFS

No Drawing. Application filed September 24, 1926, Serial No. 137,624, and in Great Britain October 8, 1925.

This invention relates to the manufacture of colouring matters, more particularly vat dyestuffs.

The object of the invention is to provide a modified or improved blue vat dyestuff or a modified or improved process for producing blue vat dyestuffs.

The invention in brief consists in a method for the preparation of a blue vat dyestuff, according to which substantially pure 1-amino-2-chlor-anthraquinone is heated at or near the boiling point in naphthalene or nitrobenzene in the presence of sodium carbonate and a catalyst containing copper, preferably in the form of copper powder or a cupric chloride.

In carrying the invention into effect in one form by way of example, reference to parts being to parts by weight, 1-amino-2-chlor-anthraquinone is prepared in the following manner:—(3'-amino-4'-chlor)-2-benzoyl-benzoic acid is condensed in the presence of sulphuric acid, the melt is diluted to a sulphuric acid concentration of about 80% to separate a product, this being apparently 2-amino-3-chlor-anthraquinone. On diluting the mother liquors further, a second isomer is obtained, which appears to consist of 1-amino-2-chlor-anthraquinone. This crude 1-amino-2-chlor-anthraquinone can be purified by recrystallizing from organic solvents or, for example, by recrystallizing from 70% sulphuric acid.

In order to effect this purification conveniently, 1 part of 1-amino-2-chlor-anthraquinone is dissolved in 4 parts of concentrated sulphuric acid (94-97%) at 90° C. The solution is diluted at this temperature with water so as to bring the strength of the acid down to 70% sulphuric acid. It is then allowed to cool to 80° C., and kept at this temperature until the sulphate of pure 1-amino-2-chlor-anthraquinone separates out. Sufficient time is then allowed for the material to crystallize (say about ½ to 1 hour), and the sludge is filtered quickly at the same temperature. If crystallization does not start immediately the solution is seeded with some of the pure compound.

The cake is washed with hot 70% sulphuric acid, then boiled with water, filtered and washed free from acid.

5 parts of 1-amino-2-chlor-anthraquinone prepared and purified as described above are dissolved in 70 parts of nitro-benzene. To the solution are added 0.25 part of copper powder and 2½ parts of anhydrous sodium carbonate. The contents are well stirred and heated at boiling temperature until the formation of dyestuff is complete. The melt is then filtered hot and the cake well washed to free it from soluble sodium salts. The product appears to be 1.2:1'. 2'-N-dihydro-anthraquinone azine. If any metallic copper remains behind in the cake, it is easily separated by vatting the blue dyestuff or taking advantage of the property of its solubility in strong sulphuric acid or other well known methods.

In place of nitrobenzene referred to above, naphthalene may be used.

In place of purifying 1-amino-2-chlor-anthraquinone by recrystallization from sulphuric acid it may be recrystallized from organic solvents, for example, the high boiling solvents naphthalene, nitrobenzene and nitrotoluene. Unless in a substantially pure form, we do not regard it as suitable for the present invention. Purification should be effected before, in our view, economically practical results can be obtained.

The vat dyestuff prepared as described above may be applied by the ordinary processes of vat dyeing and printing, and yields brilliant blue shades of good fastness to bleach.

We have found that according to the present invention there may be provided valuable dyestuffs of the anthraquinone series, which dyestuffs are characterized by a brilliancy of shade and a superior fastness to bleach, as compared with the blue vat dyestuffs that are formed for instance by the fusion of 2-amino-anthraquinone with potash.

Having now described our invention, what we claim as new and desire to secure by Letters Patent is:—

1. A method for the production of a blue vat dyestuff which consists in dissolving 5 parts of substantially pure 1-amino-2-chloro-anthraquinone in about 70 parts of nitrobenzene, mixing with the solution about 0.25 part of copper powder and about 2.5 parts of anhydrous sodium carbonate and heating with stirring at substantially the boiling point of the nitrobenzene.

2. A method for the production of a blue vat dyestuff which consists in heating together 5 parts of substantially pure 1-amino-2-chloro-anthraquinone, and about 2.5 parts of anhydrous sodium carbonate in the presence of copper powder, and a solvent for the 1-amino-2-chloro-anthraquinone chosen from the group consisting of nitro-benzene and naphthalene, the heating being effected with stirring at substantially the boiling point of the aforesaid solvent.

3. A method for the production of a blue vat dyestuff which consists in heating together 5 parts of substantially pure 1-amino-2-chloro-anthraquinone and about 2.5 parts of anhydrous sodium carbonate in the presence of copper, and a solvent for the 1-amino-2-chloro-anthraquinone chosen from the group consisting of nitro-benzene and naphthalene, the heating being effected with stirring at substantially the boiling point of the aforesaid solvent.

4. A method for the production of a blue vat dyestuff which consists in dissolving 5 parts of substantially pure 1-amino-2-chloro-anthraquinone in nitrobenzene of boiling point about 210° C., mixing about 2.5 parts of anhydrous sodium carbonate therewith, and heating the mixture in the presence of a copper powder with stirring at substantially the boiling point of the solvent.

5. A method for the production of a blue vat dyestuff which consists in dissolving 5 parts of substantially pure 1-amino-2-chloro-anthraquinone in nitrobenzene of boiling point about 210° C., mixing about 2.5 parts of anhydrous sodium carbonate therewith, and heating the mixture in the presence of copper with stirring at substantially the boiling point of the solvent.

6. A method for the production of a blue vat dyestuff which consists in dissolving 5 parts of substantially pure 1-amino-2-chloro-anthraquinone in nitrobenzene and naphthalene of boiling point about 210° C., mixing about 2.5 parts of anhydrous sodium carbonate therewith, and heating the mixture in the presence of a copper powder with stirring at substantially the boiling point of the solvent.

In testimony whereof they have signed their names to this specification.

WILLIAM G. WOODCOCK.
HUGH ALBERT EDWARD DRESCHER.
E. G. BECKETT.
JOHN THOMAS.